(12) United States Patent
Borr

(10) Patent No.: US 6,516,351 B2
(45) Date of Patent: *Feb. 4, 2003

(54) ENFORCING UNIFORM FILE-LOCKING FOR DIVERSE FILE-LOCKING PROTOCOLS

(75) Inventor: Andrea Borr, Los Gatos, CA (US)

(73) Assignee: Network Appliance, Inc., Sunnyvale, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/176,599

(22) Filed: Oct. 21, 1998

(65) Prior Publication Data

US 2002/0019874 A1 Feb. 14, 2002

Related U.S. Application Data

(63) Continuation of application No. 08/985,398, filed on Dec. 5, 1997, now abandoned.

(51) Int. Cl.[7] .............................................. G06F 17/30
(52) U.S. Cl. ........................................ 709/229; 707/1
(58) Field of Search ................................. 709/201, 203, 709/217, 219, 213, 229; 707/1, 7, 8, 9, 10, 103; 710/200

(56) References Cited

U.S. PATENT DOCUMENTS 4,719,569 A 1/1988 Ludemann et al.

(List continued on next page.)

FOREIGN PATENT DOCUMENTS

EP 0306244 A2 3/1989

(List continued on next page.)

OTHER PUBLICATIONS

"Mapping the VM text files to the AIX text files", IBM Technical Disclosure Bulletin., vol. 33, No. 2, Jul. 1990, p. 341 XP000123641, IBM Corp. New York., US ISSN: 0018–8689—the whole document.

(List continued on next page.)

Primary Examiner—Le Hien Luu
Assistant Examiner—Bunjob Jaroenchonwanit
(74) Attorney, Agent, or Firm—Swernofsky Law Group PC

(57) ABSTRACT

The invention provides a method and system for correct interoperation of multiple diverse file server or file locking protocols, using a uniform multi-protocol lock management system. A file server determines, before allowing any client device to access data or to obtain a lock, whether that would be inconsistent with existing locks, regardless of originating client device or originating protocol for those existing locks. A first protocol enforces mandatory file-open and file-locking together with an opportunistic file-locking technique, while a second protocol lacks file-open semantics and provides only for advisory byte-range and file locking. Enforcing file-locking protects file data against corruption by NFS client devices. A CIFS client device, upon opening a file, can obtain an "oplock" (an opportunistic lock). When a client device issues a non-CIFS protocol request for the oplocked file, the file server sends an oplock-break message to the CIFS client device, giving the CIFS client device the opportunity to flush any cached write operations and possibly close the file. Allowing NFS and NLM requests to break oplocks ensures that file data remains available to NFS client devices simultaneously with protecting integrity of that file data. A CIFS client device can obtain a "change-monitoring" lock for a directory in the file system, so as to be notified by the file server whenever there is a change to that directory. The file server notes changes to the directory by both CIFS and non-CIFS client devices, and notifies those CIFS client devices with "change-monitoring" locks of those changes.

114 Claims, 5 Drawing Sheets

U.S. PATENT DOCUMENTS

| | | |
|---|---|---|
| 4,742,450 A | 5/1988 | Duvall et al. |
| 4,780,821 A | 10/1988 | Crossley |
| 4,825,354 A | 4/1989 | Agrawal et al. ............ 364/200 |
| 4,887,204 A | 12/1989 | Johnson et al. |
| 4,937,763 A | 6/1990 | Mott .......................... 364/550 |
| 4,984,272 A | 1/1991 | McIlroy et al. ............... 380/25 |
| 5,008,786 A | 4/1991 | Thatte |
| 5,043,876 A | 8/1991 | Terry |
| 5,067,099 A | 11/1991 | McCown et al. ........... 364/550 |
| 5,113,442 A | 5/1992 | Moir ........................... 380/25 |
| 5,144,659 A | 9/1992 | Jones ............................ 380/4 |
| 5,202,983 A | 4/1993 | Orita et al. ................. 395/600 |
| 5,222,217 A | 6/1993 | Blount et al. ............... 395/325 |
| 5,261,051 A | 11/1993 | Masden et al. |
| 5,283,830 A | 2/1994 | Hinsley et al. ............... 380/25 |
| 5,319,780 A * | 6/1994 | Catino et al. ................... 707/8 |
| 5,504,883 A | 4/1996 | Coverston et al. |
| 5,535,375 A * | 7/1996 | Eshel et al. .................... 703/27 |
| 5,572,711 A | 11/1996 | Hirsch et al. ............... 395/500 |
| 5,596,754 A * | 1/1997 | Lomet ........................ 709/229 |
| 5,604,862 A | 2/1997 | Midgely et al. ........ 395/182.04 |
| 5,617,568 A | 4/1997 | Ault et al. .................. 395/612 |
| 5,628,005 A * | 5/1997 | Horvig ........................... 707/8 |
| 5,649,152 A | 7/1997 | Ohran et al. ................ 395/441 |
| 5,649,196 A | 7/1997 | Woodhill et al. ............ 395/620 |
| 5,668,958 A | 9/1997 | Bendert et al. ............. 710/128 |
| 5,675,726 A | 10/1997 | Hohenstein et al. |
| 5,675,782 A | 10/1997 | Montague et al. .......... 395/609 |
| 5,689,701 A | 11/1997 | Ault et al. .................. 395/610 |
| 5,720,029 A | 2/1998 | Kern et al. |
| 5,721,916 A | 2/1998 | Pardikar ..................... 395/617 |
| 5,737,523 A | 4/1998 | Callaghan et al. ...... 395/187.01 |
| 5,737,744 A | 4/1998 | Callison et al. |
| 5,740,367 A * | 4/1998 | Spilo .......................... 709/201 |
| 5,742,752 A | 4/1998 | DeKoning |
| 5,761,669 A | 6/1998 | Montague et al. .......... 707/103 |
| 5,819,292 A | 10/1998 | Hitz et al. ................... 707/203 |
| 5,819,310 A | 10/1998 | Vishlitzky ................... 711/114 |
| 5,825,877 A | 10/1998 | Dan et al. ....................... 380/4 |
| 5,828,876 A * | 10/1998 | Fish et al. ...................... 707/1 |
| 5,835,953 A | 11/1998 | Ohran ......................... 711/162 |
| 5,876,278 A | 3/1999 | Cheng ......................... 454/184 |
| 5,890,959 A | 4/1999 | Pettit et al. .................. 454/184 |
| 5,915,087 A | 6/1999 | Hammond et al. ..... 395/187.01 |
| 5,931,935 A | 8/1999 | Calbrera et al. ............ 710/260 |
| 5,940,828 A * | 8/1999 | Anaya et al. ................... 707/8 |
| 5,963,962 A | 10/1999 | Hitz et al. ................... 707/202 |
| 5,996,086 A | 11/1999 | Delaney et al. ................. 714/4 |
| 5,999,943 A | 12/1999 | Nori et al. ................... 707/104 |
| 6,067,541 A | 5/2000 | Raju et al. |
| 6,085,234 A * | 7/2000 | Pitts et al. ................... 709/217 |
| 6,275,953 B1 * | 8/2001 | Vahalia et al. ................. 714/11 |
| 6,279,011 B1 | 8/2001 | Muhlestein |
| 2001/0039622 A1 | 11/2001 | Hitz et al. |
| 2002/0019936 A1 | 2/2002 | Hitz et al. |

FOREIGN PATENT DOCUMENTS

| | | | |
|---|---|---|---|
| EP | 0308056 A2 | 3/1989 | |
| EP | 0410630 A | 1/1991 | |
| EP | 0477039 A2 | 3/1992 | |
| EP | 0477039 A3 | 3/1992 | |
| EP | 0 477 039 A | 3/1992 | |
| EP | 0537098 | 4/1993 | |
| EP | 0566967 A | 10/1993 | |
| EP | 0760503 A1 | 3/1997 | |
| JP | 1-273395 | 11/1989 | ................ 361/695 |
| WO | WO 8903086 A1 | 4/1989 | |
| WO | WO 9930254 A1 | 6/1999 | |
| WO | WO 9945456 A1 | 9/1999 | |
| WO | WO 9966401 A1 | 12/1999 | |
| WO | WO 0131446 A1 | 5/2001 | |
| WO | WO 02/29572 A2 | 4/2002 | |

OTHER PUBLICATIONS

"Migrated Data Backup Utility", IBM Technical Disclosure Bulletin., vol. 37, No. 06B, Jun. 1994, pp. 505–507, XP000456079, IBM Corp. New York., US ISSN: 0018–8689.

R. Reichel: "Inside Windows NT Security:Part 1" Windows/DOS Developers' Journal, vol. 4, No. 4, Apr. 1993, pp. 6–19, XP002107445, Lawrence, Ks, USA.

Borr A J: "SecureShare: safe Unix/Windows file sharing through multiprotocol locking" Proceeding of the 2nd Usenix Windows NT Symposiom, proceedings of 2nd Usenix Windows NT Symposiom, Seattle, WA, USA, Aug., 3–5, 1998, pp. 117–126, XP002097387 ISBN 1–880446–95–2, 1998, Berkeley, CA, USA, Usenix Assoc. USA.

Tanner J:"CIFS: Common Internet File System" Unix Review, vol. 31, Feb. 1997, pp. 31/32, 34, XPOOO783952 see whole document, relevant to claim No. 1–38.

* cited by examiner

ENFORCING UNIFORM FILE-LOCKING FOR DIVERSE FILE-LOCKING PROTOCOLS

This application is a continuation of application Ser. No. 08/985,398, filed Dec. 5, 1997 now abandoned.

BACKGROUND OF THE INVENTION

1. Field of the Invention

The invention relates to locking in a multi-protocol file server.

2. Related Art

In an integrated computer network, it is desirable for multiple client devices to share files. One known method is to provide a network file server for storing files, ca pable of receiving and responding to file server requests from those client devices. These file server requests are made using a file server protocol, which is recognized and adhered to by both the file server and the client device. Because the files are stored at the file server, multiple client devices have the opportunity to share simultaneous access to files.

One problem in the art is that there are multiple diverse file server protocols, each with differing semantics for file operations. It is known to provide a single file server that recognizes multiple file server protocols, but there is a particular difficulty in that many file server protocols have differing and incompatible semantics for file locking and file sharing. Incompatible locking semantics presents a hurdle in providing a single file system to multiple diverse client devices. If a first client device relies on a first file server protocol (having first file-locking semantics), a second client device using a second file server protocol (having different file-locking semantics) can cause applications at that first client device to fail catastrophically. Thus, correct operation of each file server protocol relies on conformity with its file-locking semantics by all other file server protocols.

For example, one protocol commonly used for devices using the Unix operating system (or a variant thereof) is the NFS ("Network File System") protocol. Devices using the Windows operating system (or a variant thereof) can also use the NFS protocol by means of the "PC NFS" implementation. The NFS protocol is designed to be stateless, and so does not provide any semantics for files to be locked against sharing or otherwise restricted to a single client device. In contrast, one protocol commonly used for devices using the Windows operating system is the CIFS ("Common Internet File System") protocol. The CIFS protocol has an extensive mandatory file-locking semantics, which CIFS client devices rely on and expect to be adhered to.

In known systems, the NFS protocol has been augmented with an adjunct file-locking protocol, NLM ("Network Lock Manager"), but the NFS protocol treats NLM locks as merely advisory. While this method achieves the purpose of providing file-locking semantics to those NFS applications that use it, it does not prevent NFS applications from ignoring those file-locking semantics, nor does it allow client devices to rely on the file-locking semantics of multiple diverse file server protocols.

Accordingly, it would be desirable to provide a method and system for enforcing file-locking semantics among client devices using multiple diverse file server protocols. This advantage is achieved in an embodiment of the invention in which a uni form set of file-locking semantics is integrated into the kernel of a multi-protocol file server and enforced for client devices using any of the diverse file server protocols recognized by the server. In a preferred embodiment, specific file-locking semantics of the CIFS protocol are implemented so as to allow NFS client devices to inter-operate with CIFS client devices so as to protect data integrity during client access to a shared file system resident on a network file server.

SUMMARY OF INVENTION

The invention provides a method and system for correct interoperation of multiple diverse file server protocols. A file server recognizing multiple diverse file server protocols provides a uniform multi-protocol lock management system (including a uniform file-locking semantics), which it enforces for all client devices and all recognized file server protocols. In a preferred embodiment, a first file server protocol (such as CIFS) enforces mandatory file-open and file-locking semantics together with an opportunistic file-locking technique, while a second file server protocol (such as NFS, together with an adjunct protocol NLM) lacks file-open semantics and provides only for advisory byte-range and file locking semantics.

The uniform file-locking semantics provides that the file server determines, before allowing any client device to read or write data, or to obtain a new file lock or byte-range lock, whether that would be inconsistent with existing locks, regardless of originating client device and regardless of originating file server protocol or file-locking protocol for those existing locks. In the case of CIFS client devices attempting to read or write data, the file server performs this check when the client device opens the file. In the case of CIFS client devices requesting a byte-range lock, the file server performs this check when the client device requests the byte-range lock. In the case of NFS client devices, the file server performs this check when the client device actually issues the read or write request, or when the NFS client device requests an NLM byte-range lock indicating intent to read or write that byte range. Enforcing file-locking semantics protects file data against corruption by NFS client devices.

In a second aspect of the invention, a CIFS client device, upon opening a file, can obtain an "oplock" (opportunistic lock), an exclusive file lock that permits only that one client to read or write the file. When a client device issues a non-CIFS (that is, NFS or NLM) protocol request for the oplocked file, the file server sends an oplock-break message to the CIFS client device, giving the CIFS client device the opportunity to flush any cached write operations and possibly close the file. Allowing NFS and NLM requests to break oplocks ensures that file data remains available to NFS client devices simultaneously with protecting integrity of that file data.

In a third aspect of the invention, a CIFS client device can obtain a "change-monitoring" lock for a directory in the file system, so as to be notified by the file server whenever there is a change to that directory. (Changes to a directory include creating, deleting or renaming files within that directory, or moving files into or out of that directory.) The file server notes changes to the directory by both CIFS client devices and non-CIFS client devices, and notifies those CIFS client devices with "change-monitoring" locks of those changes.

DETAILED DESCRIPTION OF THE PREFERRED EMBODIMENT

In the following description, a preferred embodiment of the invention is de scribed with regard to preferred process steps and data structures. Those skilled in the art would recognize after perusal of this application that embodiments of the invention can be implemented using general purpose processors or special purpose processors or other circuits adapted to particular process steps and data structures described herein, and that implementation of the process steps and data structures described herein would not require undue experimentation or further invention.

System Architecture (Client/Server)

Figure 1:
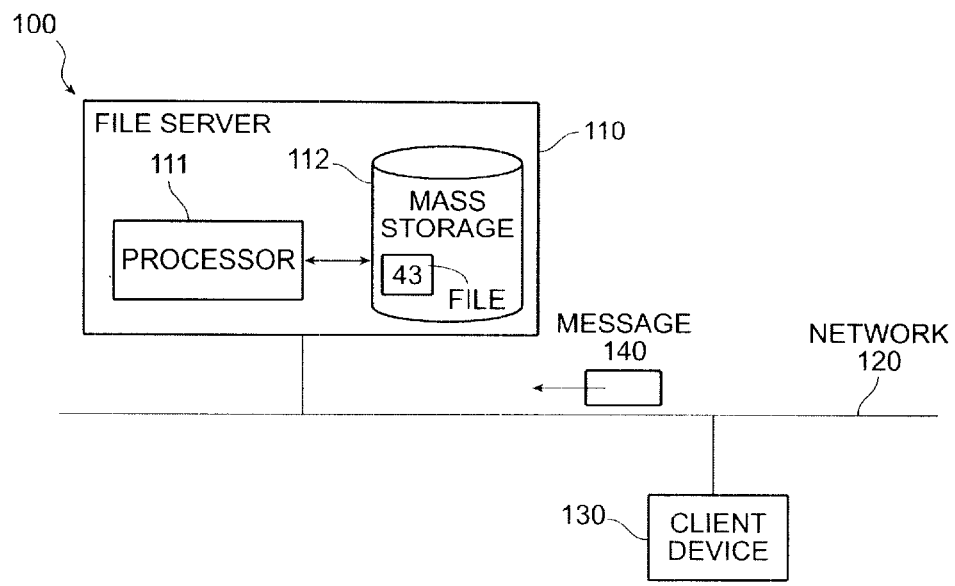
FIG. 1 shows a first block diagram of a system including a multi-protocol file server.

FIG. 1 shows a first block diagram of a system including a multi-protocol file server.

A system 100 includes a file server 110, a computer network 120, and a plurality of client devices 130.

The file server 110 includes a processor 111 and mass storage 112. The mass storage 112 is capable of storing and retrieving a set of files 113 having data for storage and retrieval. The processor 111 is capable of receiving a sequence of request messages 140 from the network 120, parsing those messages as commands and data, and manipulating the files 113 on the mass storage 112, and sending response messages, in response to those commands and data.

The file server 110 and the client devices 130 are coupled to the network 120 and communicate using messages 140 transmitted on the network 120. The messages 140 include file system requests transmitted by the client devices 130 to the file server 110 and file system responses transmitted by the file server 110 to the client devices 130.

System Architecture (File-Locking Semantics)

Figure 2:
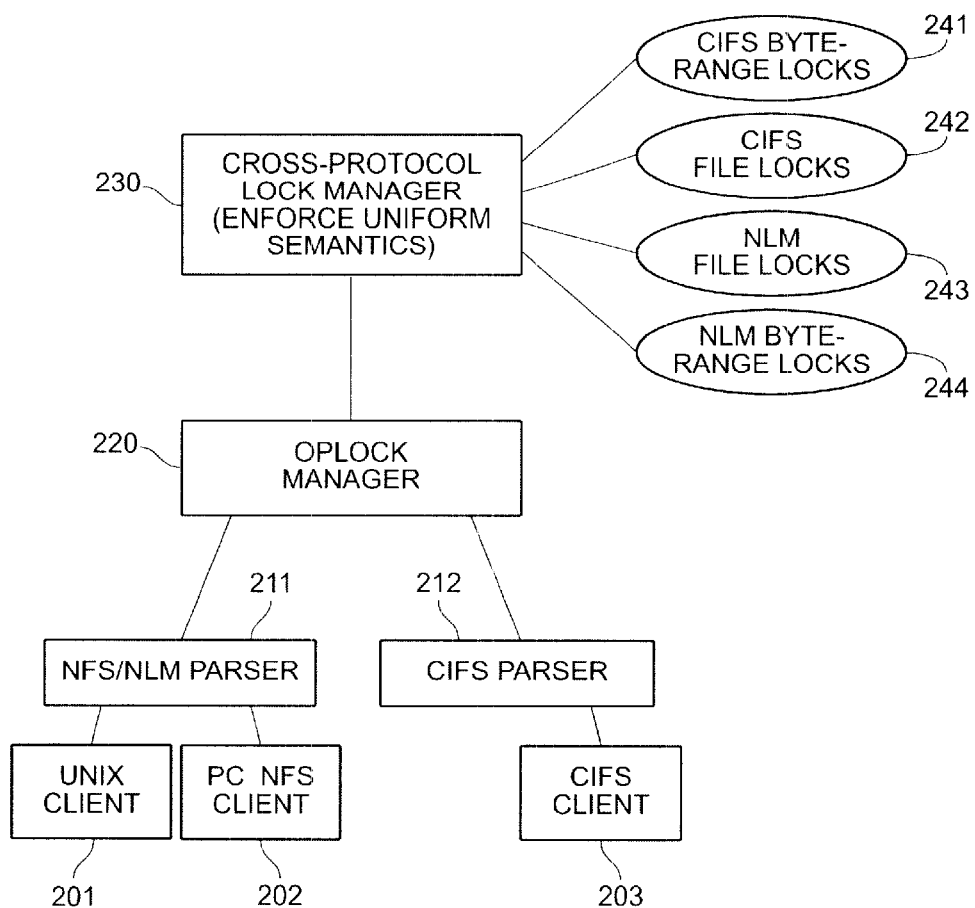
FIG. 2 shows a second block diagram of a system including a multi-protocol file server.

FIG. 2 shows a second block diagram of a system including a multi-protocol file server.

The system 100 includes the set of client devices 130, including Unix client devices 201, PC NFS Windows client devices 202, and CIFS Windows client devices 203. Unix client devices 201 execute the Unix operating system and use the Unix/NFS file server protocol. PC NFS Windows client devices 202 execute the Windows operating system and use the PC NFS file server protocol. CIFS Windows client devices 203 execute the Windows operating system and use the CIFS file server protocol.

Unix client devices 201 and PC NFS Windows client devices 202 communicate with the file server 110 using the NFS file server protocol, which is recognized at the file server 110 by an NFS file server protocol parser 211. CIFS Windows client devices 203 communicate with the file server 110 using the CIFS file server protocol, which is recognized at the file server 110 by a CIFS file server protocol parser 212. Messages using either the NFS file server protocol or the CIFS file server protocol are parsed by the processor 111 and processed by an oplock manager 220.

The oplock manager 220 manages access to files 113 having CIFS oplocks. Its operation is described in further detail with regard to FIG. 3 and FIG. 5. The oplock manager element 220 is coupled to a cross-protocol lock manager 230.

The cross-protocol lock manager 230 manages the file-locking semantics of the file server 110. It processes and records information regarding four types of locks—CIFS byte-range locks 241, CIFS file locks 242, PC NFS (NLM) file locks 243, and NLM byte-range locks 244. The operation of the cross-protocol lock manager 230 in enforcing uniform file-locking semantics is described in further detail with regard to FIG. 3 and FIG. 4.

Differing File-Locking Semantics

As noted with regard to FIG. 2, file server request messages 140 can be received from Unix client devices 201, PC NFS Windows client devices 202, or CIFS Windows client devices 203, and can use the NFS file server protocol or the CIFS file server protocol. In addition to each using differing file server protocols, each of these types of client device 130 has a different model of file locking provided by the file server 110.

In particular, the NFS file server protocol provides for performing file system operations without any form of file-open or file-close semantics. These NFS file system operations can include read or write operations to file data, or file system manipulation (that is, read and write operations to directories). File system manipulation can include creating files or directories, renaming files or directories, moving files from one directory to another, or removing (deleting) files or directories from the file system.

The NLM adjunct protocol provides for obtaining and releasing byte-range locks for files. These byte-range locks can be "read locks," which induce other compliant applications (such as at other client devices 130) to refrain from writing to the specified byte-range. These byte-range locks can alternatively be "write locks," which induce other compliant applications to refrain from either reading from or writing to the specified byte-range.

The CIFS file server protocol provides for performing file-open operations, and obtaining file locks on the files 113 to be opened, before attempting any read or write operations to data in those files 113. At file-open time, a CIFS client device 130 can specify the access-mode it desires (read-only, write-only, or read-write), and the deny-mode desires to impose on other client devices 130 attempting to open the same file 113 (deny-none, deny-read, deny-write, or deny-all). Thereafter, CIFS file system operations need only be checked against the access-mode that the file-open obtained. A CIFS client device 130 can also specify a byte-range lock for a byte-range in a file the client device 130 holds open. The byte-range lock is either an exclusive lock, also called a "write lock" (having access-mode read-write and deny-mode deny-all), or a nonexclusive lock, also called a "read lock" (having access-mode read-only and deny-mode deny-write).

The file server 110 determines a lock mode that combines the access-mode and the deny-mode. As used herein, the phrase "lock mode" refers to a uniform lock mode imposed by the file server 110 which combines an access-mode and a deny-mode.

At file-open time, CIFS client devices 130 can also obtain an oplock (opportunistic lock), which provides that the CIFS client device 130 opening the file has exclusive access to the file so long as another client device 130 does not attempt to use the file. The oplock provides a higher degree of exclusivity to the file than strictly necessary for the client device 130, with the caveat that the exclusivity of the oplock can be broken by attempted access by another client device 130.

The file server 110 provides for correct interoperation among client devices 130 using NFS (with or without the adjunct protocol NLM) or CIFS. To provide for correct interoperation, the file server 110 provides a uniform file-locking semantics. In a preferred embodiment, the uniform file-locking semantics has the following effects:

- The file server 110 prevents Unix client devices 201 from performing NFS write operations that would overwrite data in a file 113 that is already opened and in use by a CIFS client with deny-modes deny-write or deny-all.
- The file server 110 prevents Unix client devices 201 and PC NFS Windows client devices 202 from performing NFS file system operations that would remove or re-name a file 113 that is already opened and in use by a CIFS client.
- When a Unix client device 201 or a PC NFS Windows client device 202 makes an NFS request to remove, rename, or write data to a file 113 that is oplocked by a CIFS client, the file server 110 will enforce CIFS oplock semantics for the file 113. The file server 110 sends an oplock-break message 140 to the client device 130 holding the oplock, and receives a response from the client device 130. If the client device 130 closes the file 113, the NFS request can proceed and the file server 110 allows it to.
- When a Unix client device 201 or a PC NFS Windows client device 202 makes an NFS request to read data from a file 113 that is oplocked by a CIFS client, the file server 110 will enforce CIFS oplock semantics for the file 113. The file server 110 sends an oplock-break message 140 to the client device 130 holding the oplock, and receives a response from the client device 130. When the client device 130 either closes the file 113 or flushes its write cache to the file server 110, the NFS request can proceed and the file server 110 allows it to.
- The file server 110 tests for mutual compatibility for file-open requests from CIFS Windows client devices 203, and NLM file lock requests from PC NFS Windows client devices 202, with regard to their specified lock modes. The phrase NLM "file lock" is used herein in place of the known phrase NLM "share lock," further described in the following document: "X/Open CAE Specification: Protocols for X/Open Interworking: XNFS, Issue 4 (X/Open Document Number C218), hereby incorporated by reference as if fully set forth herein. The specified lock mode is determined by the file server 110 by combining the requested access-mode and deny-mode.

To provide these effects, the file server 110 performs the following lock management operations:

- Upon receiving a CIFS file-open request message 140, the file server 110 tests the file-open request for conflict with existing CIFS and NLM file locks, and for conflict with existing NLM byte-range locks. For the purpose of comparison with newly requested file locks, the file server 110 treats existing NLM byte-range locks as having deny-mode deny-none, and as having access-mode read-only for nonexclusive locks and access-mode read-write for exclusive locks.
- Upon receiving a CIFS byte-range lock request message 140, the file server 110 tests the byte-range lock request for conflict with existing CIFS and NLM byte-range locks.
- Upon receiving an NLM byte-range lock request message 140, the file server 110 tests the byte-range lock request for conflict with existing CIFS and NLM byte-range locks, and for conflict with existing CIFS file locks.
- Upon receiving an NLM file lock request message 140 from a PC NFS client device 130 (used to simulate a file-open request message 140), the file server 110 tests the NLM file lock request for conflict with existing CIFS and NLM file locks, and for conflict with existing NLM byte-range locks. For the purpose of comparison with newly requested NLM file locks, the file server 110 treats existing NLM byte-range locks as having deny-mode deny-none, and as having access-mode read-only for nonexclusive locks and access-mode read-write for exclusive locks.

Method of Operation (Multi-Protocol File Server)

Figure 3:
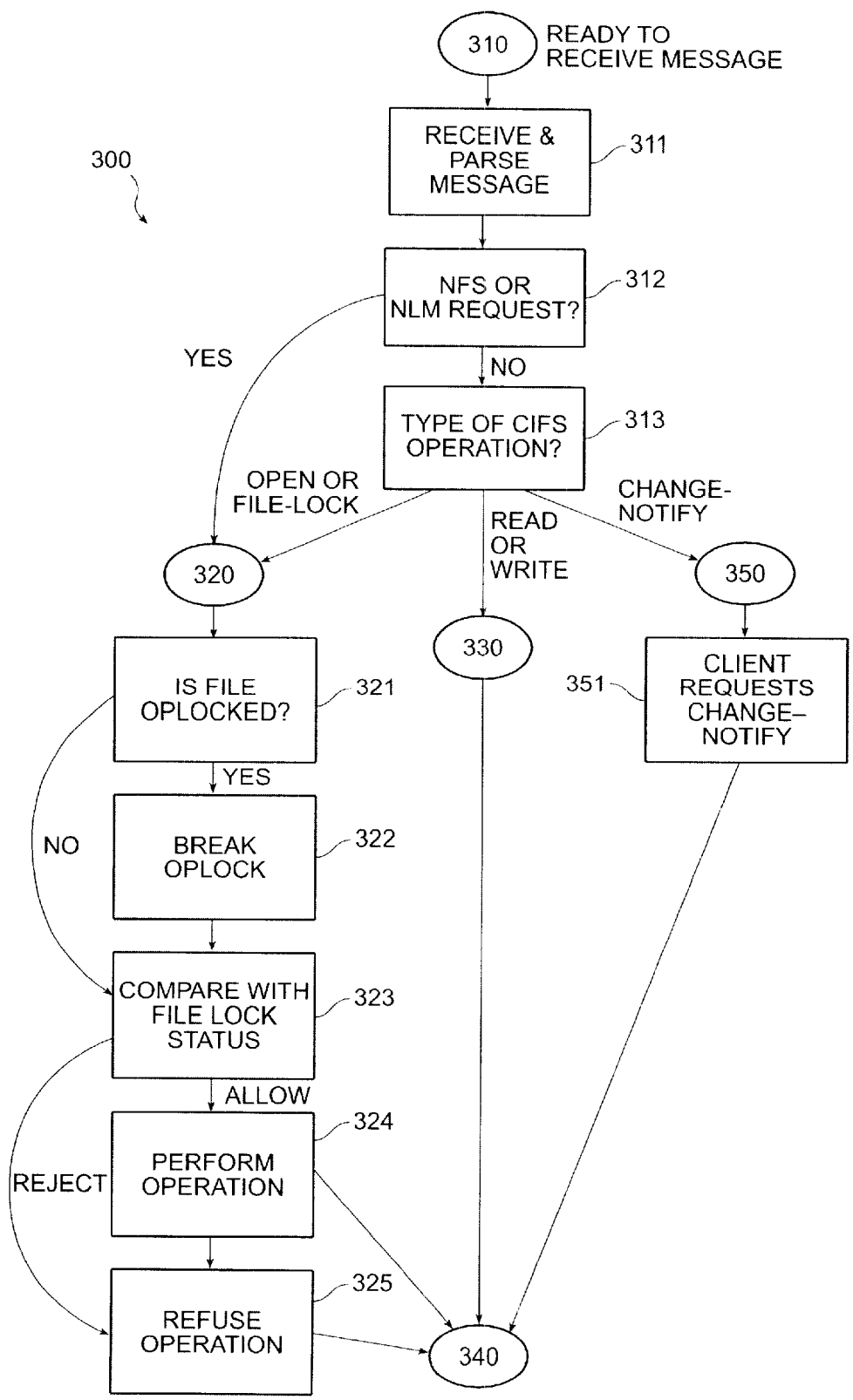
FIG. 3 shows a process flow diagram of a method of operating a multi-protocol file server.

FIG. 3 shows a process flow diagram of a method of operating a multi-protocol file server.

A method 300 of operating a multi-protocol file server includes a set of process steps and flow points as described herein, to be performed by the file server 110 in cooperation with at least one client device 130.

At a flow point 310, the file server 110 is ready to receive the file server request message 140.

At a step 311, the file server 110 receives and parses the file server request message 140. The file server 110 determines if the file server request message 140 uses the NFS file server protocol, the NLM file locking protocol, or the CIFS file server protocol. If the file server request message 140 uses the NFS file server protocol or the NLM file locking protocol, the method 300 continues with the step 312. If the file server request message 140 uses the CIFS file server protocol, the method 300 continues with the step 313.

At a step 312, the file server 110 determines if the request message 140 includes an NFS file server request to perform a file system operation (such as to read or write data, or to modify a directory). Alternatively, the file server 110 determines if the request message 140 includes an NLM file-locking request to obtain an NLM byte-range lock. In either case, the method 300 continues at the flow point 320.

At a step 313, the file server 110 determines if the file server request message 140 is to perform a CIFS read or write operation, to obtain a CIFS byte-range lock, or to perform a CIFS file-open operation. In the file server request message 140 is to obtain a CIFS byte-range lock or to perform a CIFS file-open operation, the method 300 continues at the flow-point 320. If the file server request message 140 is to perform a CIFS read or write operation, the method continues at the flow-point 330. If the file server request message 140 is a CIFS "change-notify" request, the method continues at the flow point 350 (the change-notify request is further described with regard to FIG. 6).

At a flow point 320, the file server 110 is ready to compare the operation requested by the file server request message 140 with the file-locking status of the file 113. The file-locking status of the file 113 includes existing file locks and byte-range locks for the file 113.

At a step 321, the file server 110 determines the file 113 that is the subject of the file server request message 140, and determines if the file 113 is oplocked. If the file 113 is oplocked, the method 300 continues with the step 322. If the file 113 is not oplocked, the method 300 continues with the step 323.

At a step 322, the file server 110 breaks the oplock, as described herein. Performance of the step 322 is further described with regard to FIG. 5. Breaking the oplock can cause the file-locking status of the file 113 to change.

At a step 323, the file server 110 compares the requested operation with the file-locking status of the file 113, using a uniform file-locking semantics. In this step, the requested operation can be an NFS read or write operation, an NFS or CIFS directory modification operation, an attempt to obtain an NLM file lock or byte-range lock, or a CIFS file-open operation. Performance of the step 323 and the uniform file-locking semantics are further described with regard to FIG. 4. If the comparison shows that the requested operation is allowable, the method 300 continues with the step 324. If the requested operation is not allowable, the method 300 continues with the step 325.

At a step 324, the file server 110 performs the requested operation. The method 300 continues at the flow point 340.

At a step 325, the file server 110 refuses to perform the requested operation and responds to the client device 130 with an error message. The method 300 continues at the flow point 340.

At a flow point 330, the file server 110 is ready to compare the operation requested by the file server request message 140 with the file-locking status of the file 113.

At a flow point 350, the file server 110 is ready to perform the change-notify operation, as described herein.

At a step 351, a first CIFS client device 130 requests a file lock for a directory (using a file system request message 140 to open the directory), and converts the file lock for the directory to a change-monitoring lock on the directory. Performance of this step 351 is further described with regard to FIG. 6.

At a flow point 340, the file server 110 has responded to the file server request message 140, and the method 300 is complete with regard to that file server request message 140.

Method of Operation (Cross-Protocol Lock Manager)

Figure 4:
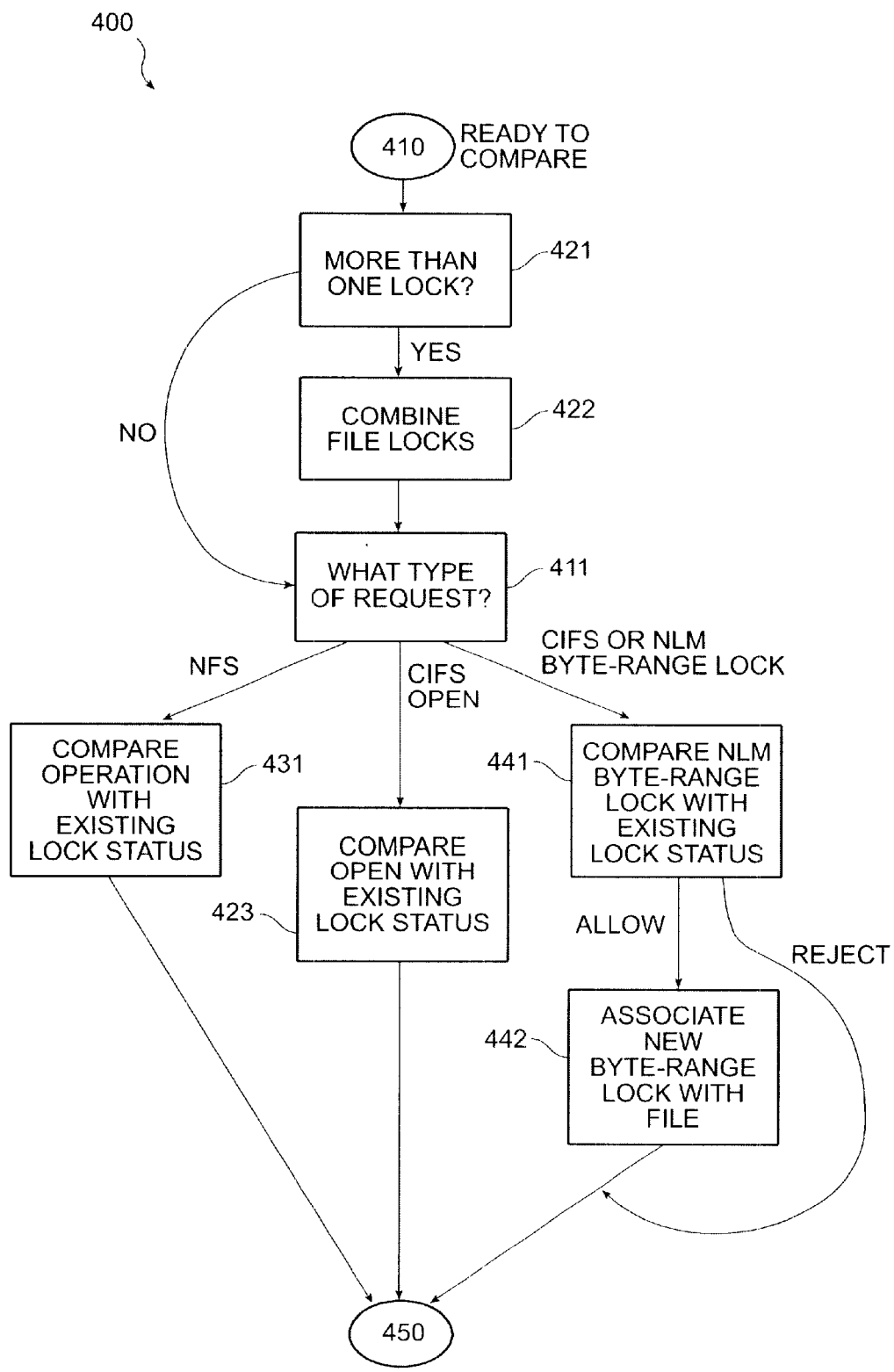
FIG. 4 shows a process flow diagram of a method of operating a cross-protocol lock manager in a multi-protocol file server.

FIG. 4 shows a process flow diagram of a method of operating a cross-protocol lock manager in a multi-protocol file server.

A method 400 of operating a cross-protocol lock manager in a multi-protocol file server includes a set of process steps and flow points as described herein, to be performed by the file server 110 in cooperation with at least one client device 130.

At a flow point 410, the file server 110 is ready to compare the requested operation in the file server request message 140, with the file-locking status of the file 113.

The file server 110 uses a uniform file-locking semantics, so as to model file-locking aspects of any requested operation from any file server protocol in the same way. The uniform file-locking semantics identifies a uniform set of file locks, each including an access-mode for the requesting client device 130 and a deny-mode for all other client devices 130.

In a preferred embodiment, the access-mode can be one of three possibilities—read-only, write-only, or read-write. Similarly, in a preferred embodiment, the deny-mode can be one of four possibilities—deny-none, deny-read, deny-write, or deny-all.

After a first client device 130 obtains a file lock for a file 113, a second client device 130 can only access that file 113 if the lock mode determined by the file server 110 to be requested by the second client device 130 is compatible with the file-locking status of the file 113. For example, a first client device 130 can obtain a file lock for a file 113 with a deny-mode deny-write. A second NFS client device 130 could attempt to write to the file 113, or a second CIFS client device 130 could attempt to open the file 113 with an access-mode including write access. In either such case (if the file lock for the file 113 is not an opportunistic lock, as further described herein), the file server 110 will deny the request by the second client device 130.

As noted herein, the file server 110 performs the comparison of the file lock with the access requested by the second client device 130 at differing times, in response to the file server protocol used by the second client device 130:

If the second client device 130 uses the CIFS file server protocol to open the file 113, the file server 110 checks the file-locking status of the file 113 at file-open time.

If the second client device 130 uses the NFS file server protocol to read or write to the file 113, the file server 110 checks the file-locking status of the file 113 at the time of the actual file system operation. This also applies to file system operations that have the effect of removing the file from view of the first client device 130, such as operations to move, remove, or rename the file 113.

If the second client device 130 uses the CIFS file server protocol to request a byte-range lock, the file server 110 checks the file-locking status of the file 113 for conflict with other CIFS or NLM byte-range locks, at the time the byte-range lock is requested. The file server 110 does not check for conflict with other CIFS file locks at the time the byte-range lock is requested, because those were checked at file-open time.

If the second client device 130 uses the NLM protocol to request a byte-range lock, the file server 110 checks the file-locking status of the file 113 for conflict with existing CIFS or NLM byte-range locks, and for conflict with existing CIFS file locks, at the time the byte-range lock is requested.

At a step 421, the file server 110 determines if there is already more than one file lock associated with the file 113. If so, the method 400 continues with the step 422. If not, the method continues with the step 411.

At a step 422, the file server 110 combines file locks already associated with the file 113 into a single equivalent file lock associated with the file 113. To perform this step 422, the file server 110 cross-indexes in table 1 a cumulative file lock with each pre-existing file lock, until all pre-existing file locks have been cumulated together.

Table 1 shows a lock conversion table in a multi-protocol file server with unified file-locking semantics.

TABLE 1

Lock Conversion Matrix

| | | Existing file lock mode | | | | | | | | |
|---|---|---|---|---|---|---|---|---|---|---|
| | NULL | A: R<br>D: DN | A: W<br>D: DN | A: RW<br>D: DN | A: R<br>D: DR | A: W<br>D: DR | A: RW<br>D: DR | A: R<br>D: DW | A: W<br>D: DW | A: RW<br>D: DW | A: Any<br>D: DA |
| New lock mode | | | | | | | | | | | |
| NULL | NULL | A: R<br>D: DN | A:W<br>D: DN | A: RW<br>D: DN | A: R<br>D: DR | A:W<br>D: DR | A: RW<br>D: DR | A: R<br>D: DW | A:W<br>D: DW | A: RW<br>D: DW | A: Any<br>D: DA |

TABLE 1-continued

Lock Conversion Matrix

Existing file lock mode

|  | NULL | A: R<br>D: DN | A: W<br>D: DN | A: RW<br>D: DN | A: R<br>D: DR | A: W<br>D: DR | A: RW<br>D: DR | A: R<br>D: DW | A: W<br>D: DW | A: RW<br>D: DW | A: Any<br>D: DA |
|---|---|---|---|---|---|---|---|---|---|---|---|
| A: R<br>D: DN | A: R<br>D: DN | A: R<br>D: DN | A: RW<br>D: DN | A: RW<br>D: DN | A: R<br>D: DR | A: RW<br>D: DR | A: RW<br>D: DR | A: R<br>D: DW | A: RW<br>D: DW | A: RW<br>D: DW | A: Any<br>D: DA |
| A: W<br>D: DN | A: W<br>D: DN | A: RW<br>D: DN | A: W<br>D: DN | A: RW<br>D: DN | A: RW<br>D: DR | A: W<br>D: DR | A: RW<br>D: DR | A: RW<br>D: DW | A: W<br>D: DW | A: RW<br>D: DW | A: Any<br>D: DA |
| A: RW<br>D: DN | A: RW<br>D: DN | A: RW<br>D: DN | A: RW<br>D: DN | A: RW<br>D: DN | A: RW<br>D: DR | A: RW<br>D: DR | A: RW<br>D: DR | A: RW<br>D: DW | A: RW<br>D: DW | A: RW<br>D: DW | A: Any<br>D: DA |
| A: R<br>D: DR | A: R<br>D: DR | A: R<br>D: DR | A: RW<br>D: DR | A: RW<br>D: DR | A: R<br>D: DR | A: RW<br>D: DR | A: RW<br>D: DR | A: Any<br>D: DA | A: Any<br>D: DA | A: Any<br>D: DA | A: Any<br>D: DA |
| A: W<br>D: DR | A: W<br>D: DR | A: RW<br>D: DR | A: W<br>D: DR | A: RW<br>D: DR | A: RW<br>D: DR | A: W<br>D: DR | A: RW<br>D: DR | A: Any<br>D: DA | A: Any<br>D: DA | A: Any<br>D: DA | A: Any<br>D: DA |
| A: RW<br>D: DR | A: RW<br>D: DR | A: RW<br>D: DR | A: RW<br>D: DR | A: RW<br>D: DR | A: RW<br>D: DR | A: RW<br>D: DR | A: RW<br>D: DR | A: Any<br>D: DA | A: Any<br>D: DA | A: Any<br>D: DA | A: Any<br>D: DA |
| A: R<br>D: DW | A: R<br>D: DW | A: R<br>D: DW | A: RW<br>D: DW | A: RW<br>D: DW | A: Any<br>D: DA | A: Any<br>D: DA | A: Any<br>D: DA | A: R<br>D: DW | A: RW<br>D: DW | A: RW<br>D: DW | A: Any<br>D: DA |
| A: W<br>D: DW | A: W<br>D: DW | A: RW<br>D: DW | A: W<br>D: DW | A: RW<br>D: DW | A: Any<br>D: DA | A: Any<br>D: DA | A: Any<br>D: DA | A: RW<br>D: DW | A: W<br>D: DW | A: RW<br>D: DW | A: Any<br>D: DA |
| A: RW<br>D: DW | A: RW<br>D: DW | A: RW<br>D: DW | A: RW<br>D: DW | A: RW<br>D: DW | A: Any<br>D: DA | A: Any<br>D: DA | A: Any<br>D: DA | A: RW<br>D: DW | A: RW<br>D: DW | A: RW<br>D: DW | A: Any<br>D: DA |
| A: Any<br>D: DA | A: Any<br>D: DA | A: Any<br>D: DA | A: Any<br>D: DA | A: Any<br>D: DA | A: Any<br>D: DA | A: Any<br>D: DA | A: Any<br>D: DA | A: Any<br>D: DA | A: Any<br>D: DA | A: Any<br>D: DA | A: Any<br>D: DA |

A = Access Mode (R = Read, W = Write, RW = Read-Write, Any = any one of R or W or RW)
D = Deny Mode (DN = Deny None, DR = Deny Read, DW = Deny Write, DA = Deny All)

At a step 411, the file server 110 determines the nature of the requested operation in the file server request message 140. If the requested operation is a CIFS file-open operation, the method 400 continues with the step 423. If the requested operation is an NFS file server operation, the method 400 continues with the step 431. If the requested operation is either a CIFS request an NLM request for a byte-range lock, the file system 110 continues with the step 441.

At a step 423, the file server 110 compares the file lock already associated with the file 113 with the file open requested by the second client device 130. To perform this step 423, the file server 110 cross-indexes in table 2 the pre-existing file lock and the requested new access-mode and deny-mode, and allows or denies the requested new access-mode and deny-mode in response to the associated table entry.

If the file server 110 allows the requested new access-mode and deny-mode, the method 400 performs the step 424. If the file server 110 denies the requested new access-mode and deny-mode, the method 400 does not perform the step 424.

Table 2 shows a cross-index of attempted file locks in a multi-protocol file server with unified file-locking semantics.

TABLE 2

Multi-Protocol Lock Compatibility Matrix

Pre-existing file lock

|  | NULL | A: R<br>D: DN | A: R<br>D: DR | A: R<br>D: DW | A: W<br>D: DN | A: W<br>D: DR | A: W<br>D: DW | A: RW<br>D: DN | A: RW<br>D: DR | A: RW<br>D: DW | A: Any<br>D: DA |
|---|---|---|---|---|---|---|---|---|---|---|---|
| New mode being requested |  |  |  |  |  |  |  |  |  |  |  |
| NULL | ✓ | ✓ | ✓ | ✓ | ✓ | ✓ | ✓ | ✓ | ✓ | ✓ | ✓ |
| A: R<br>D: DN | ✓ | ✓ | X | ✓ | ✓ | X | ✓ | ✓ | X | ✓ | X |
| A: R<br>D: DR | ✓ | X | X | X | ✓ | X | ✓ | ✓ | X | ✓ | X |
| A: R<br>D: DW | ✓ | ✓ | X | ✓ | X | X | X | X | X | X | X |
| A: W<br>D: DN | ✓ | ✓ | ✓ | X | ✓ | ✓ | X | ✓ | ✓ | X | X |
| A: W<br>D: DR | ✓ | X | X | X | ✓ | ✓ | X | X | X | X | X |
| A: W<br>D: DW | ✓ | ✓ | ✓ | X | X | X | X | X | X | X | X |
| A: RW<br>D: DN | ✓ | ✓ | X | X | ✓ | X | X | ✓ | X | X | X |

TABLE 2-continued

Multi-Protocol Lock Compatibility Matrix

Pre-existing file lock

|  | NULL | A: R D: DN | A: R D: DR | A: R D: DW | A: W D: DN | A: W D: DR | A: W D: DW | A: RW D: DN | A: RW D: DR | A: RW D: DW | A: Any D: DA |
|---|---|---|---|---|---|---|---|---|---|---|---|
| A: RW D: DR | ✓ | X | X | X | ✓ | X | X | X | X | X | X |
| A: RW D: DW | ✓ | ✓ | X | X | X | X | X | X | X | X | X |
| A: Any D: DA | ✓ | X | X | X | X | X | X | X | X | X | X |

A = Access Mode, D = Deny Mode
✓ = New request will be granted. X = New request will be denied.

As shown in table 2, each pair of pre-existing file lock and requested new access-mode and deny-mode has an associated decision to allow or to deny the requested new access-mode and deny-mode.

If the file server 110 is checking for conflicts between an existing CIFS file lock and a new request to perform a file-open operation, the existing CIFS file lock is cross-indexed against the access-mode and deny-mode requested in the new file-open request.

If the file server 110 is checking for conflicts between existing file locks and a new NFS request to perform a file read or write operation, the aggregate lock mode (the combination of existing file locks) is cross-indexed against the access-mode required to perform the new request.

If the file server 110 is checking for conflicts between existing file locks or byte-range locks, and a new request for a NLM byte-range lock, the existing file locks and byte-range locks are cross-indexed against a lock mode equivalent to the new NLM byte-range lock request. For the purpose of comparing with existing file locks, the file server 110 treats newly requested NLM byte-range locks as having deny-mode deny-none, and as having access-mode read-only for nonexclusive locks (also called "read locks") and access-mode read-write for exclusive locks (also called "write locks"). For the purpose of comparing with existing byte-range locks, the file server 110 treats newly requested NLM byte-range locks as having access-mode read-only and deny-mode deny-write for read locks, and as having access-mode read-write and deny-mode deny-all for write locks.

The method 400 then continues at the flow point 450.

At a step 431, the file server 110 compares the file-locking status of the file 113 with the operation requested by the second client device 130. To perform this step 431, the file server 110 compares the deny-mode for the file lock with the requested operation, and allows or denies the requested operation in response thereto.

The method 400 then continues at the flow point 450.

At a step 441, the file server 110 compares the file-locking status of the file 113 with the NLM byte-range lock requested by the second client device 130. In a preferred embodiment, CIFS byte-range lock requests are only checked against byte-range locks because they require a prior CIFS file open operation at which existing file locks were already checked. To perform this step 441, the file server 110 cross-indexes in table 3 the pre-existing file-locking status and the requested byte-range lock, and allows or denies the requested byte-range lock in response to the associated table entry.

If the file server 110 allows the requested new NLM byte-range lock, the method 400 performs the step 442. If the file server 110 denies the requested new byte-range lock, the method 400 does not perform the step 442.

Table 3 shows a cross-index of existing file locks and newly requested NLM byte-range locks in a multi-protocol file server with unified file-locking semantics.

TABLE 3

Compatibility of new NLM byte-range locks with existing file locks

Existing lock mode

|  | NULL | A: R D: DN | A: R D: DR | A: R D: DW | A: W D: DN | A: W D: DR | A: W D: DW | A: RW D: DN | A: RW D: DR | A: RW D: DW | A: Any D: DA |
|---|---|---|---|---|---|---|---|---|---|---|---|
| Write Lock | ✓ | ✓ | ✓ | X | ✓ | ✓ | X | ✓ | ✓ | X | X |
| Read Lock | ✓ | ✓ | X | ✓ | ✓ | X | ✓ | ✓ | X | ✓ | X |

A = Access Mode, D = Deny mode
✓ = New NLM byte-range lock request will be granted.
X = New NLM byte-range lock request will be denied.

As shown in table 3, each pair of existing file lock and newly requested NLM byte-range lock has an associated decision to allow or to deny the requested new byte-range lock.

At a step 442, the file server 110 associates the requested new byte-range lock with the file 113 as a new additional byte-range lock.

The method 400 then continues at the flow point 450.

At a flow point 450, the file server 110 has compared the requested operation in the file server request message 140 with the file-locking status of the file 113, and allowed or denied the requested operation.

Method of Operation (Oplock Manager)

Figure 5:
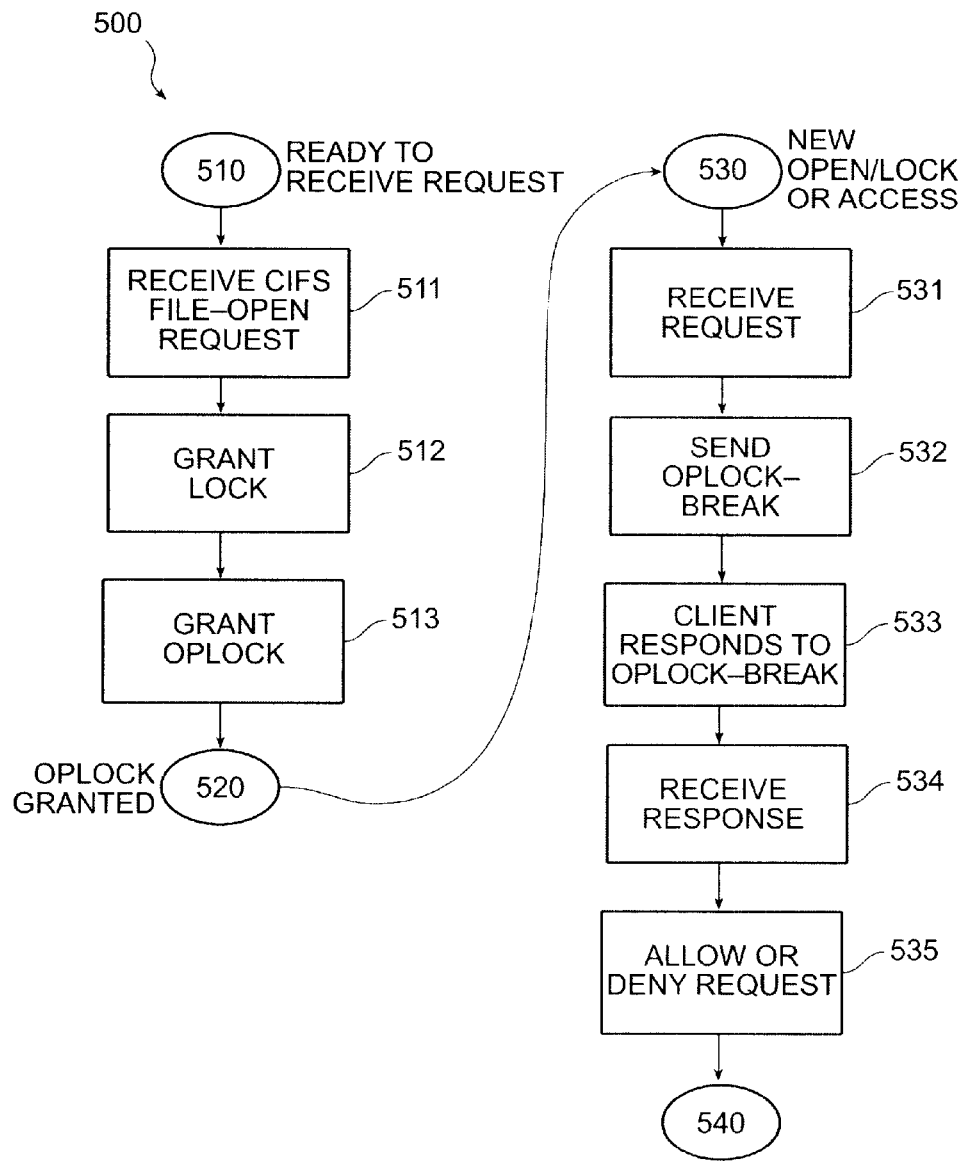
FIG. 5 shows a process flow diagram of a method of operating an oplock manager in a multi-protocol file server.

FIG. 5 shows a process flow diagram of a method of operating an oplock manager in a multi-protocol file server.

A method 500 of operating a oplock manager in a multi-protocol file server includes a set of process steps and flow points as described herein, to be performed by the file server 110 in cooperation with at least one client device 130.

Oplocks are known in the art of file-locking in Windows operating system environments. They are further described in documentation available for the "Windows NT 4.0" operating system, available from Microsoft Corporation of Redmond, Wash., including for example the CIFS IETF specification, available via the FTP protocol at host ftp.microsoft.com, directory /developr/drg/CIFS, files cifs6.doc or cifs6.txt, hereby incorporated by reference as if fully set forth herein.

At a flow point 510, the file server 110 is ready to receive a request from a CIFS first client device 130 to open a file 113.

At a step 511, the file server 110 receives a file-open request for a file 113 from a CIFS first client device 130. The file-open request designates an access-mode and a deny-mode.

At a step 512, the file server 110 determines that it should allow the request, and grants the first client device 130 a file lock with the designated access-mode and deny-mode.

At a step 513, if the client device 130 has requested an oplock on the file open request, the file server 110 grants the first client device 130 an oplock at a level of exclusivity possibly greater than the first client device 130 actually requires.

For example, when a CIFS first client device 130 opens a file 113 with the access-mode read-only and deny-mode deny-write, the file server 110 associates a file lock of that type with the file 113. The file server 110 further associates an oplock with the file 113 with the access-mode read-write and deny-mode deny-all.

At a flow point 520, the file server 110 has responded to the request from the CIFS first client device 130 for a file lock for a file 113.

At a flow point 530, a second client device 130 attempts to open the file 113.

At a step 531, the file server 110 receives either a file-open request from a second CIFS client device 130 or a NLM file lock request from a PC NFS client device 130.

As part of performing this step 531, the file server 110 suspends execution of the request by the second client device 130 while it breaks the oplock and obtains a response from the holder of the oplock, the first client device 130.

At a step 532, the file server 110 breaks the oplock by sending an "oplock break" message 140 to the CIFS first client device 130.

When the second client device 130 is a CIFS client device 130, this is already expected. When the second client device 130 is an NFS client device 130, the file server 110 delays its response to the NFS (or NLM) protocol request message 140 until the CIFS first client device 130 responds to the "oplock-break" message 140.

At a step 533, the CIFS first client device 130 receives the "oplock-break" message 140, and can respond to the message 140 in one of two ways:

The CIFS first client device 130 can close the file 113 (thus removing the file lock associated with the file-open); or The CIFS first client device 130 can flush all outstanding CIFS write and byte-range lock requests for the file 113 that are being cached locally at the client device 130 (that is, it can forward the results of those file system operations to the file server 110), and discard any read-ahead data it has obtained for the file 113. Read-ahead data should be discarded because the second client device 130 might subsequently write new data to the file, invalidating the read-ahead data.

At a step 534, the file server 110 receives the response from the CIFS first client device 130.

At a step 535, the file server 110 determines if the CIFS first client device 130 has maintained the file 113 open, and if so, compares the lock mode implied by the request by the second client device 130 against the new file-locking status of the file 113. If the file server 110 determines that the request by the second client device 130 is allowed to proceed, it continues with the flow point 540. If the file server 110 determines that the request by the second client device 130 is not allowed to proceed, it denies the request.

At a flow point 540, the file server 110 is ready to proceed to allow the request from the second client device 130 noted in the step 531.

Method of Operation (Change-Notify Manager)

Figure 6:
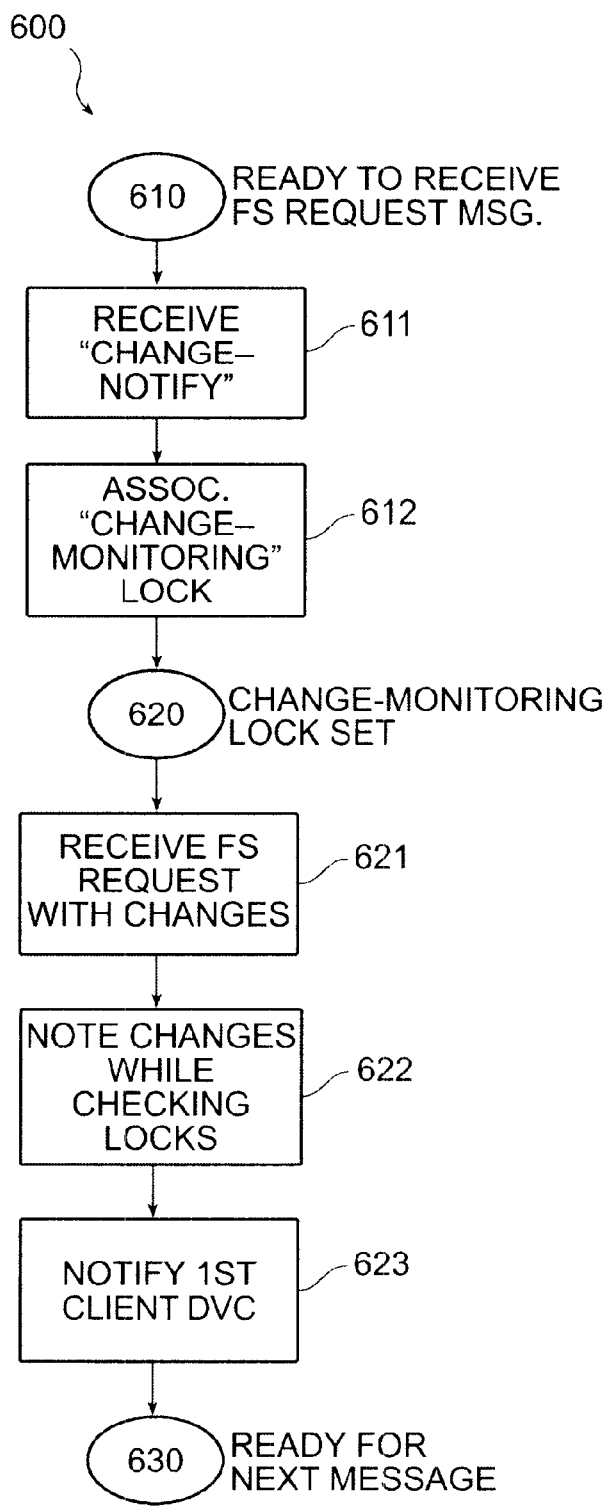
FIG. 6 shows a process flow diagram of a method of operating a change-notify manager in a multi-protocol file server.

FIG. 6 shows a process flow diagram of a method of operating a change-notify manager in a multi-protocol file server.

A method 600 of operating a change-notify manager in a multi-protocol file server includes a set of process steps and flow points as described herein, to be performed by the file server 110 in cooperation with at least one client device 130.

At a flow point 610, the file server 110 is ready to receive the file server request message 140.

At a step 611, the file server 110 receives a file-open request message 140 from a first CIFS client device 130, designating a directory on the file server 110. The file server 110 determines that it should allow the file-open request and grants a CIFS file lock on the directory to the first CIFS client device 130.

At a step 612, the file server 110 receives a change-notify request message from the first CIFS client device 130, referencing the open directory, to convert the file lock on the open directory to a change-monitoring lock.

At a step 613, the file server 110 converts the file lock on the open directory to a change-monitoring lock on the designated directory.

At a flow point 620, the "change-monitoring" lock has been associated with the designated directory, and the first CIFS client device 130 is ready to be notified of changes to that directory.

At a step 621, the file server 110 receives a file server request message 140 from a second client device 130, requesting a change to the designated directory, and thus triggering a change notification to the first client device 130. (Types of change include file creation, file deletion, file rename, file move between directories, file attribute change, and file modification time change.) The file server request message 140 from the second client device 130 can be either CIFS or NFS. The second client device 130 can be any one of a Unix NFS client device 201, a PC NFS client device 202, or a CIFS Windows client device 203.

At a step 622, the file server 110 notifies the first client device 130, which holds the "change-monitoring" lock, of the changes noted in the step 621, containing possibly multiple entries, each of which specifies both the name of the changed file 113 or subdirectory within the monitored directory and the type of change. If there is more than one such first client device 130, the file server 110 notifies all of them.

Change-notification is known in the art of file-locking in Windows NT operating system environments. It is further described in documentation available for the "Windows NT 4.0" operating system, available from Microsoft Corporation of Redmond, Wash., including for example the CIFS IETF specification, available via the FTP protocol at host ftp.microsoft.com, directory /developr/drg/CIFS, files cifs6.doc or cifs6.txt, hereby incorporated by reference as if fully set forth herein.

At a flow point 630, the file server 110 has notified the first CIFS client device 130 of changes to the designated directory, and is ready for a next message 140.

ALTERNATIVE EMBODIMENTS

Although preferred embodiments are disclosed herein, many variations are possible which remain within the concept, scope, and spirit of the invention, and these variations would become clear to those skilled in the art after perusal of this application.

TECHNICAL APPENDIX

Other and further information about the invention is included in a technical appendix enclosed with this application. This technical appendix includes 30 pages (including drawings) and is hereby incorporated by reference as if fully set forth herein.

What is claimed is:

1. A method of operating a file server, said method including steps for enforcing a uniform file-locking semantics among a set of client devices using a plurality of diverse file-locking protocols, said file server implementing said plurality of diverse file-locking protocols and enforcing said uniform file-locking semantics for said plurality of diverse file locking protocols;

wherein said uniform file-locking semantics includes steps for granting an opportunistic lock on a selected file to a first said client device in response to a first message using a first protocol; and breaking said opportunistic lock in response to a second message using a second protocol;

wherein the first protocol and the second protocol are ones of said plurality of diverse file locking protocols.

2. A method as in claim 1, wherein said uniform file-locking semantics includes said opportunistic lock capable of being requested by said first client device using said first protocol; and breaking of said opportunistic lock being triggered by said second client device using said second protocol different from said first protocol.

3. A method as in claim 2, wherein said first protocol includes CIFS.

4. A method as in claim 2, wherein said second protocol includes NFS or NLM.

5. A method as in claim 1, wherein said steps for breaking include steps for sending an oplock-break message to said first client device in response to said second message;

delaying execution of a file system request indicated by said second message;

receiving a response to said oplock-break message from said first client device; and processing and responding to said second message after said step of receiving.

6. A method as in claim 1, wherein said uniform file-locking semantics includes a change-monitoring lock type capable of being requested by said first client device using said first protocol; and a change notification being triggered by said second client device using said second protocol different from said first protocol.

7. A method as in claim 6, wherein said first protocol includes CIFS.

8. A method as in claim 6, wherein said second protocol includes NFS.

9. A method as in claim 1, wherein said uniform file-locking semantics includes steps for granting a change-monitoring lock on a selected directory to said first client device in response to said first message using said first protocol; and sending a change-notify message to said first client device in response to said second message regarding said selected directory using said second protocol.

10. A method as in claim 1, wherein said steps for enforcing include steps for recognizing said plurality of diverse file locking protocols;

providing said uniform file-locking semantics in response to messages using at least one of said diverse file-locking protocols; and enforcing said uniform file-locking semantics for all said client devices.

11. A method as in claim 10, wherein said uniform file-locking semantics includes steps for granting said opportunistic lock to a said first said client device in response to said first message using said first protocol; and breaking said opportunistic lock in response to said second message using said second protocol.

12. A method as in claim 11, wherein said steps for breaking include steps for sending an oplock-break message to said first client device in response to said second message;

delaying execution of a file system request indicated by said second message;

receiving a response to said oplock-break message from said first client device; and processing and responding to said second message after said step of receiving.

13. A method as in claim 10, wherein said steps for enforcing said uniform file-locking semantics include steps for granting a change-monitoring lock in response to said first message from said first client device using said first protocol; and sending a change-notify message to said first client device in response to said second message using said second protocol.

14. A method as in claim 10, wherein said steps for enforcing said uniform file-locking semantics include steps for recognizing a selected message that attempts to violate said uniform file-locking semantics; and responding to said selected message with an error response suited to a protocol associated with said selected message.

15. A method as in claim 10, wherein said steps for enforcing said uniform file-locking semantics include steps for recognizing a selected message for obtaining a byte-range lock on a file in a selected one of said diverse file locking protocols, said byte-range lock having a lock type; and testing whether obtaining said byte-range lock would conflict with existing locks created by messages using the same or other diverse file locking protocols.

16. A method as in claim 10, wherein said steps for enforcing said uniform file-locking semantics include steps for recognizing a selected message for opening a file in a selected one of said diverse file-locking protocols, said selected message including a requested access-mode; and testing whether opening said file using said requested access-mode would conflict with existing locks created by messages using the same or other diverse file-locking protocols.

17. A method as in claim 16, wherein said selected message includes a requested deny-mode; and including steps for testing whether opening said file using said requested deny-mode would conflict with existing locks created by messages using the same or other diverse file locking protocols.

18. A method as in claim 10, wherein said steps for enforcing said uniform file-locking semantics include steps for recognizing a selected message for reading from or writing to a file in a selected one of said diverse file locking protocols; and testing whether reading from or writing to would conflict with existing locks created by messages using the same or other diverse file locking protocols.

19. A method as in claim 1, wherein said steps for enforcing include steps for receiving said first message using said first protocol, said first message being operative to lock at least a portion of a selected file;

receiving said second message using said second protocol, said second message being operative to request access to said portion;

comparing said access requested by said second message with said lock, and denying said access if prohibited by said lock.

20. A method as in claim 19, wherein said first protocol includes CIFS.

21. A method as in claim 19, wherein said first protocol or said second protocol includes NLM.

22. A method as in claim 19, wherein said second protocol includes NFS.

23. A method as in claim 19, wherein said steps for receiving said second message include steps for recognizing said second message as being for obtaining a byte-range lock on a file using said second protocol, said byte-range lock having a lock type; and said steps for comparing include steps for testing whether obtaining said byte-range lock having said lock type would conflict with existing locks created by messages using the same or other diverse file-locking protocols.

24. A method as in claim 23, wherein said steps for testing are responsive to one of said diverse file locking protocols used for said second message.

25. A method as in claim 23, wherein said steps for testing operate at file-open time for said first protocol and at an access time for said second protocol.

26. A method as in claim 23, wherein said steps for testing operate at file-open time for said first protocol and at a lock-request time for said second protocol.

27. A method as in claim 19, wherein said steps for receiving said second message include steps for recognizing said second message for opening a file using said second protocol, said second message including a requested access-mode; and said steps for comparing include steps for testing whether accessing said file using said requested access-mode would conflict with existing locks created by messages using the same or other diverse file locking protocols.

28. A method as in claim 19, wherein said steps for receiving said second message include steps for recognizing said second message for reading from or writing to a file using said second protocol; and said steps for comparing include steps for testing whether accessing said file as attempted by said second message would conflict with existing locks created by messages using the same or other diverse file locking protocols.

29. A method as in claim 19, wherein said steps for receiving said first message include steps for granting said opportunistic lock in response to said first message; and said steps for comparing include steps for breaking said opportunistic lock in response to said second message.

30. A method as in claim 29, wherein said steps for breaking include steps for sending an oplock-break message to said first client device in response to said second message;

delaying execution of a file system request indicated by said second message;

receiving a response to said oplock-break message from said first client device; and processing and responding to said second message after said step of receiving.

31. A method as in claim 30, wherein said response to said oplock-break message includes an oplock-break acknowledgement message or a file close message.

32. A method as in claim 1, wherein said file-locking semantics includes a lock mode determined in response to an access-mode and a deny-mode requested by said first client device using said first protocol.

33. A method as in claim 1, wherein said file-locking semantics includes a first lock mode determined in response to an access-mode and a deny-mode requested by said first client device using said first protocol; and a second lock mode determined in response to a message from a second client device using said second protocol different from said first protocol;

wherein said file server is responsive to comparison of said first lock mode with said second lock mode.

34. A method as in claim 33, wherein said comparison includes a lock compatibility matrix.

35. A method as in claim 33, wherein said comparison includes a lock conversion matrix.

36. A method as in claim 33, wherein said second lock mode is responsive to a request for a byte-range lock.

37. A method as in claim 33, wherein said second lock mode is responsive to a request for a NLM file lock.

38. A file server comprising a processor, mass storage, and an interface to a network, the file server operating under control of the processor to perform steps including steps for enforcing a uniform file-locking semantics among a set of client devices using a plurality of diverse file locking protocols, said file server implementing said plurality of diverse file locking protocols and enforcing said uniform file-locking semantics for said plurality of diverse file locking protocols;

wherein said uniform file-locking semantics includes steps for granting an opportunistic lock on a selected file to a first client device in response to a first message using a first protocol; and breaking said opportunistic lock in response to a second message using a second protocol;

wherein the first protocol and the second protocol are ones of said plurality of diverse file locking protocols.

39. A file server as in claim 38, wherein said uniform file-locking semantics includes said opportunistic lock capable of being requested by said first client device using said first protocol; and breaking of said opportunistic lock being triggered by a second client device using said second protocol different from said first protocol.

40. A file server as in claim 39, wherein said first protocol includes CIFS.

41. A file server as in claim 39, wherein said second protocol includes NFS or NLM.

42. A file server as in claim 38, wherein said uniform file-locking semantics includes steps for granting an opportunistic lock on a selected file to a first said client device in response to a first message using a first said protocol; and breaking said opportunistic lock in response to a second message using a second said protocol.

43. A file server as in claim 38, wherein said steps for breaking include steps for sending an oplock-break message to said first client device in response to said second message;

delaying execution of a file system request indicated by said second message;

receiving a response to said oplock-break message from said first client device; and processing and responding to said second message after said step of receiving.

44. A file server as in claim 38, wherein said uniform file-locking semantics includes a change-monitoring lock type capable of being requested by said first client device using said first protocol; and a change notification being triggered by a second client device using said second protocol different from said first protocol.

45. A file server as in claim 44, wherein said first protocol includes CIFS.

46. A file server as in claim 44, wherein said second protocol includes NFS.

47. A file server as in claim 38, wherein said uniform file-locking semantics includes steps for granting a change-monitoring lock on a selected directory to said first client device in response to said first message using said first protocol; and sending a change-notify message to said first client device in response to said second message regarding said selected directory using said second protocol.

48. A file server as in claim 38, wherein said steps for enforcing include steps for recognizing said plurality of diverse file locking protocols;

providing said uniform file-locking semantics in response to messages using at least one of said diverse file locking protocols; and enforcing said uniform file-locking semantics for all said client devices.

49. A file server as in claim 48, wherein said uniform file-locking semantics includes steps for granting said opportunistic lock to said first said client device in response to said first message using said first protocol; and breaking said opportunistic lock in response to said second message using said second protocol.

50. A file server as in claim 49, wherein said steps for breaking include steps for sending an oplock-break message to said first client device in response to said second message;

delaying execution of a file system request indicated by said second message;

receiving a response to said oplock-break message from said first client device; and processing and responding to said second message after said step of receiving.

51. A file server as in claim 48, wherein said steps for enforcing said uniform file-locking semantics include steps for granting a change-monitoring lock in response to said first message from said first client device using said first protocol; and sending a change-notify message to said first client device in response to said second message using said second protocol.

52. A file server as in claim 48, wherein said steps for enforcing said uniform file-locking semantics include steps for recognizing a selected message that attempts to violate said uniform file-locking semantics; and responding to said selected message with an error response suited to a protocol associated with said selected message.

53. A file server as in claim 48, wherein said steps for enforcing said uniform file-locking semantics include steps for recognizing a selected message for obtaining a byte-range lock on a file in a selected one of said diverse file locking protocols, said byte-range lock having a lock type; and testing whether obtaining said byte-range lock would conflict with existing locks created by messages using the same or other diverse file locking protocols.

54. A file server as in claim 48, wherein said steps for enforcing said uniform file-locking semantics include steps for recognizing a selected message for opening a file in a selected one of said diverse file locking protocols, said selected message including a requested access-mode; and testing whether opening said file using said requested access-mode would conflict with existing locks created by messages using the same or other diverse file locking protocols.

55. A file server as in claim 54, wherein said selected message includes a requested deny-mode; and including steps for testing whether opening said file using said requested deny-mode would conflict with existing locks created by messages using the same or other diverse file locking protocols.

56. A file server as in claim 48, wherein said steps for enforcing said uniform file-locking semantics include steps for recognizing a selected message for reading from or writing to a file in a selected one of said diverse file locking protocols; and testing whether reading from or writing to would conflict with existing locks created by messages using the same or other diverse file locking protocols.

57. A file server as in claim 38, wherein said steps for enforcing include steps for receiving said first message using said first protocol, said first message being operative to lock at least a portion of a selected file;

receiving said second message using said second protocol, said second message being operative to request access to said portion;

comparing said access requested by said second message with said lock, and denying said access if prohibited by said lock.

58. A file server as in claim 57, wherein said first protocol includes CIFS.

59. A file server as in claim 57, wherein said first protocol or said second protocol includes NLM.

60. A file server as in claim 57, wherein said second protocol includes NFS.

61. A file server as in claim 57, wherein said steps for receiving said second message include steps for recognizing said second message as being for obtaining a byte-range lock on a file using said second protocol, said byte-range lock having a lock type; and said steps for comparing include steps for testing whether obtaining said byte-range lock having said lock type would conflict with existing locks created by messages using the same or other diverse file locking protocols.

62. A file server as in claim 61, wherein said steps for testing are responsive to one of said diverse file locking protocols used for said second message .

63. A file server as in claim 61, wherein said steps for testing operate at file-open time for said first protocol and at an access time for said second protocol.

64. A file server as in claim 61, wherein said steps for testing operate at file-open time for said first protocol and at a lock-request time for said second protocol.

65. A file server as in claim 57, wherein said steps for receiving said second message include steps for recognizing said second message for opening a file using said second protocol, said second message including a requested access-mode; and said steps for camparing include steps for testing whether accessing said file using said requested access-mode would conflict with existing locks created by messages using the same or other diverse file locking protocols.

66. A file server as in claim 57, wherein said steps for receiving said second message include steps for recognizing said second message for reading from or writing to a file using said second protocol; and said steps for comparing include steps for testing whether accessing said file as attempted by said second message would conflict with existing locks vreated by messages using the same or other diverse file locking protocols.

67. A file server as in claim 57, wherein said steps for receiving said first message include steps for granting said opportunistic lock in response to said first message; and said steps for comparing include steps for breaking said opportunistic lock in response to said second message.

68. A file server as in claim 67, wherein said steps for breaking include steps for sending an oplock-break message to said first client device in response to said second message;

delaying execution of a file system request indicated by said second message;

receiving a response to said oplock-break message from said first client device; and processing and responding to said second message after said step of receiving.

69. A file server as in claim 68, wherein said response to said oplock-break message includes an oplock-break acknowledgement message or a file close message.

70. A file server as in claim 38, wherein said file-locking semantics includes a lock mode determined in response to an access-mode and a deny-mode requested by said first client device using said first protocol.

71. A file server as in claim 38, wherein said file-locking semantics includes a first lock mode determined in response to an access-mode and a deny-mode requested by said first client device using said first protocol; and a second lock mode determined in response to a message from a second client device using said second protocol different from said first protocol;

wherein said file server is responsive to comparison of said first lock mode with said second lock mode.

72. A file server as in claim 71, wherein said comparison includes a lock compatibility matrix.

73. A file server as in claim 71, wherein said comparison includes a lock conversion matrix.

74. A file server as in claim 71, wherein said second lock mode is responsive to a request for a byte-range lock.

75. A file server as in claim 71, wherein said second lock mode is responsive to a request for a NLM file lock.

76. A memory storing information including instructions, the instructions executable by a processor to operate a file server, the instructions comprising steps for enforcing file-locking semantics among a set of client devices using a plurality of diverse file locking protocols, said file server implementing said plurality of diverse file locking protocols and enforcing said uniform file-locking semantics for said plurality of diverse file locking protocols;

wherein said uniform file-locking semantics includes steps for granting an opportunistic lock on a selected file to a first client device in response to a first message using a first protocol; and breaking said opportunistic lock in response to a second message using a second protocol;

wherein the first protocol and the second protocol are ones of said plurality of diverse file locking protocols.

77. A memory as in claim 76, wherein said uniform file-locking semantics includes said opportunistic lock capable of being requested by said first client device using said first protocol; and breaking of said opportunistic lock being triggered by a second client device using said second protocol different from said first protocol.

78. A memory as in claim 77, wherein said first protocol includes CIFS.

79. A memory as in claim 77, wherein said second protocol includes NFS or NLM.

80. A memory as in claim 76, wherein said uniform file-locking semantics includes steps for granting an opportunistic lock on a selected file to a first said client device in response to a first message using a first said protocol; and breaking said opportunistic lock in response to a second message using a second said protocol.

81. A memory as in claim 76, wherein said steps for breaking include steps for sending an oplock-break message to said first client device in response to said second message;

delaying execution of a file system request indicated by said second message;

receiving a response to said oplock-break message from said first client device; and processing and responding to said second message after said step of receiving.

82. A memory as in claim 76, wherein said uniform file-locking semantics includes a change-monitoring lock type capable of being requested by a first client device using a first protocol; and a change notification being triggered by a second client device using a second protocol different from said first protocol.

83. A memory as in claim 82, wherein said first protocol includes CIFS.

84. A memory as in claim 82, wherein said second protocol includes NFS.

85. A memory as in claim 76, wherein said uniform file-locking semantics includes steps for granting a change-monitoring lock on a selected directory to said first client device in response to said first message using said first protocol; and sending a change-notify message to said first client device in response to said second message regarding said selected directory using said second protocol.

86. A memory as in claim 76, wherein said steps for enforcing include steps for recognizing said plurality of diverse file locking protocols;

providing said uniform file-locking semantics in response to messages using at least one of said diverse file locking protocols; and enforcing said uniform file-locking semantics for all said client devices.

87. A memory as in claim 86, wherein said uniform file-locking semantics includes steps for granting said opportunistic lock to said first said client device in response to said first message using said first protocol; and breaking said opportunistic lock in response to said second message using said second protocol.

88. A memory as in claim 87, wherein said steps for breaking include steps for sending an oplock-break message to said first client device in response to said second message;

delaying execution of a file system request indicated by said second message;

receiving a response to said oplock-break message from said first client device; and processing and responding to said second message after said step of receiving.

89. A memory as in claim 86, wherein said steps for enforcing said uniform file-locking semantics include steps for granting a change-monitoring lock in response to said first message from said first client device using said first protocol; and sending a change-notify message to said first client device in response to said second message using said second protocol.

90. A memory as in claim 86, wherein said steps for enforcing said uniform file-locking semantics include steps for recognizing a selected message that attempts to violate said uniform file-locking semantics; and responding to said selected message with an error response suited to a protocol associated with said selected message.

91. A memory as in claim 86, wherein said steps for enforcing said uniform file-locking semantics include steps for recognizing a selected message for obtaining a byte-range lock on a file in a selected one of said diverse file locking protocols, said byte-range lock having a lock type; and testing whether obtaining said byte-range lock would conflict with existing locks created by messages using the same or other diverse file locking protocols.

92. A memory as in claim 86, wherein said steps for enforcing said uniform file-locking semantics include steps for recognizing a selected message for opening a file in a selected one of said diverse file locking protocols, said selected message including a requested access-mode; and testing whether opening said file using said requested access-mode would conflict with existing locks created by messages using the same or other diverse file locking protocols.

93. A memory as in claim 92, wherein said selected message includes a requested deny-mode; and including steps for testing whether opening said file using said requested deny-mode would conflict with existing locks created by messages using the same or other diverse file locking protocols.

94. A memory as in claim 86, wherein said steps for enforcing said uniform file-locking semantics include steps for recognizing a selected message for reading from or writing to a file in a selected one of said diverse file locking protocols; and testing whether reading from or writing to would conflict with existing locks created by messages using the same or other diverse file locking protocols.

95. A memory as in claim 76, wherein said steps for enforcing include steps for receiving said first message using said first protocol, said first message being operative to lock at least a portion of a selected file;

receiving said second message using said second protocol, said second message being operative to request access to said portion;

comparing said access requested by said second message with said lock, and denying said access if prohibited by said lock.

96. A memory as in claim 95, wherein said first protocol includes CIFS.

97. A memory as in claim 95, wherein said first protocol or said second protocol includes NLM.

98. A memory as in claim 95, wherein said second protocol includes NFS.

99. A memory as in claim 95, wherein said steps for receiving said second message include steps for recognizing said second message as being for obtaining a byte-range lock on a file using said second protocol, said byte-range lock having a lock type; and said steps for comparing include steps for testing whether obtaining said byte-range lock having said lock type would conflict with existing locks created by messages using the same or other diverse file locking protocols.

100. A memory as in claim 99, wherein said steps for testing are responsive to one of said diverse file locking protocols used for said second message.

101. A memory as in claim 99, wherein said steps for testing operate at file-open time for said first protocol and at an access time for said second protocol.

102. A memory as in claim 99, a method as in claim 24, wherein said steps for testing operate at file-open time for said first protocol and at a lock-request time for said second protocol.

103. A memory as in claim 95, wherein said steps for receiving said second message include steps for recognizing said second message for opening a file using said second protocol, said second message including a requested access-mode; and said steps for comparing include steps for testing whether accessing said file using said requested access-mode would conflict with existing locks created by messages using the same or other diverse file locking protocols.

104. A memory as in claim 95, wherein said steps for receiving said second message include steps for recognizing said second message for reading from or writing to a file using said second protocol; and said steps for comparing include steps for testing whether accessing said file as attempted by said second message would conflict with existing locks created by messages using the same or other diverse file locking protocols.

105. A memory as in claim 95, wherein said steps for receiving said first message include steps for granting said opportunistic lock in response to said first message; and said steps for comparing include steps for breaking said opportunistic lock in response to said second message.

106. A memory as in claim 105, wherein said steps for breaking include steps for sending an oplock-break message to said first client device in response to said second message;

delaying execution of a file system request indicated by said second message;

receiving a response to said oplock-break message from said first client device; and processing and responding to said second message after said step of receiving.

107. A memory as in claim 106, wherein said response to said oplock-break message includes an oplock-break acknowledgement message or a file close message.

108. A memory as in claim 76, wherein said file-locking semantics includes a lock mode determined in response to an access-mode and a deny-mode requested by said first client device using said first protocol.

109. A memory as in claim 76, wherein said file-locking semantics includes a first lock mode determined in response to an access-mode and a deny-mode requested by said first client device using said first protocol; and a second lock mode determined in response to a message from a second client device using said second protocol different from said first protocol;

wherein said file server is responsive to comparison of said first lock mode with said second lock mode.

110. A memory as in claim 109, wherein said comparison includes a lock compatibility matrix.

111. A memory as in claim 109, wherein said comparison includes a lock conversion matrix.

112. A memory as in claim 109, wherein said second lock mode is responsive to a request for a byte-range lock.

113. A memory as in claim 109, wherein said second lock mode is responsive to a request for a NLM file lock.

114. A file server comprising processing means, mass storage means for storing files, and interface means for interfacing to a network, the processing means for enforcing a uniform file-locking semantics among a set of client devices using a plurality of diverse file locking protocols and enforcing said uniform file-locking semantics for said plurality of diverse file locking protocols;

wherein said uniform file-locking semantics includes steps for granting am opportunistic lock on a selected file to a first client device in response to a first message using a first protocol; and breaking said opportunistic lock in response to a second message using a second protocol;

wherein the first protocol and the second protocol are ones of said plurality of diverse file locking protocols.

* * * * *